July 12, 1960

B. B. BALKEMA 2,944,656

STORAGE APPARATUS

Filed July 25, 1956

INVENTOR.
BERTRAND B. BALKEMA

BY

ATTORNEYS

FIG. 3

INVENTOR.
BERTRAND B. BALKEMA.
BY
Fearman & Fearman
ATTORNEYS

INVENTOR.
BERTRAND B. BALKEMA
ATTORNEYS

FIG. 10

United States Patent Office 2,944,656
Patented July 12, 1960

2,944,656
STORAGE APPARATUS
Bertrand B. Balkema, 6286 Sterling Road,
Newport, Mich.
Filed July 25, 1956, Ser. No. 599,975
16 Claims. (Cl. 198—85)

This invention relates to storage apparatus in general and more particularly to novel and improved apparatus for receiving articles to be stored, transporting them intermittently in a cyclical path while storing them or transporting them into proximity with places of storage arranged adjacent the path of travel of the articles, and returning them when desired to a discharge location so that they can be removed and used.

Apparatus of the type to which I refer wherein a series of cages have been movable through a cyclical path to deliver and remove automobiles, for instance, to and from warehouse storage locations situated adjacent the cyclical path of travel of the cages have previously been proposed; however, no one has to my knowledge perfected a machine of this type which could be manufactured at a non-prohibitive cost and was of workable, practical design. Previously proposed systems have, for example, employed hydraulically actuated elements for moving the cages through a cyclical path of travel and it is significant that, while the need for apparatus of the type which will be described is great, no one has to my knowledge ever commercially built such a machine. Such storage apparatus is needed today, not only to alleviate the parking problem in most cities and areas of vehicle concentration, but also in our plants and factories to store parts and castings at various locations adjacent production lines.

One of the prime objects of the instant invention is to provide storage apparatus of practical design suitable for use in the storage of automobiles, and suitable also for use for storage of parts in plants where storage space is limited and parts must be readily accessible and available for removal within a minimum time.

A further object of the invention is to provide storage apparatus including elevating means, an upper transfer carriage, lowering means, and a lower transfer carriage, all of which may be mechanically driven in timed sequence by several electric motors or the like.

Another object of the invention is to reduce the cost of manufacture and operation of such units by providing columns of vertically stacked storage cages wherein the elevating and lowering means operate simultaneously in opposition such that the weight of one stack of cages counterbalances the weight of the other column of cages and a surprisingly light motor can be employed to move the columns.

A further object of the invention is to provide apparatus of the type described with interconnected means for moving the transfer carriages at different rates of speed dependent upon whether they are transporting cages or are returning empty to original position.

Another object of the invention is to design apparatus of the character set forth previously which has an upper transfer carriage whose travel is multiplied in a unique manner which permits an electric motor with a crank arm of practical length to move the carriage through its path of travel.

A further object of the invention is to provide improved storage apparatus including an upper transfer carriage of the type described having novel means actuated independently of the motor for moving the carriage through its path of travel for actuating lift arms which raise a loaded cage sufficiently to permit it to be transported from one stack to another.

Another object of the invention is to design storage apparatus including vertical stacks of cages supported one upon the other so that, if storage warehouses are employed adjacent the units, the warehouses need not bear the cumulative weight of the cages which can be supported upon foundations independent of the warehouse structures.

A still further object of the invention is to provide efficient and highly reliable storage apparatus of rugged although inexpensive construction which can be economically manufactured and installed.

With the above and other objects in view, the present invention consists in the combination and arrangement of parts hereinafter more fully described, illustrated in the accompanying drawings, and more particularly pointed out in the appended claims, it being understood that equivalent changes may be made in various elements which comprise the invention without departing from the spirit thereof or the scope of the appended claims.

For convenience only the apparatus is shown carrying gondolas to the like with castings or parts therein instead of automobiles. Each cage is designed to carry several gondolas aggregatively weighing 4000 to 7000 pounds, and storage units such as described will be spotted at various locations along a production line. As will be seen the apparatus is operated intermittently and will deliver parts in first-in first-out order. It is to be understood, however, that the same storage units may be used in a parking garage or the like to deliver automobiles into and from storage compartments arranged in tiers adjacent the path of travel of the cages.

Figure 1:
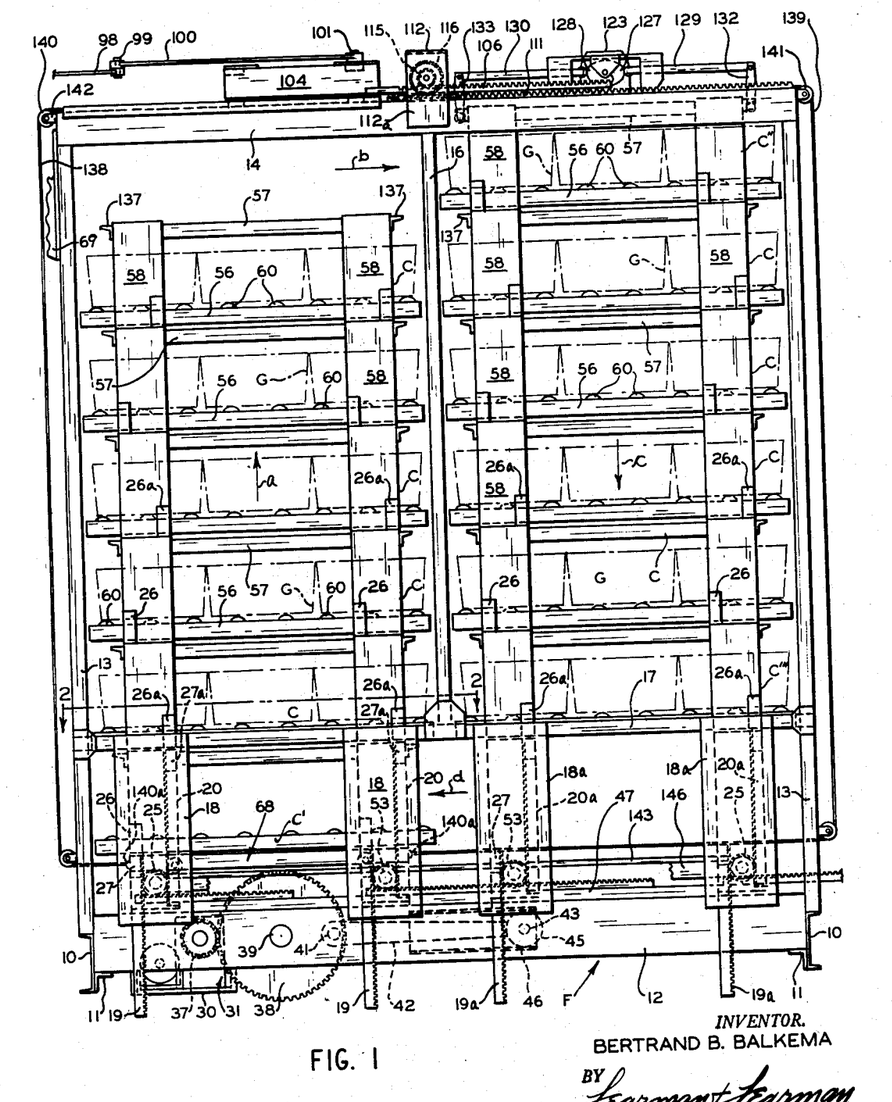
Fig. 1 is a side elevational view of my storage apparatus showing an empty cage at the bottom of the stack of cages at the left in position to be loaded.
Figure 3:
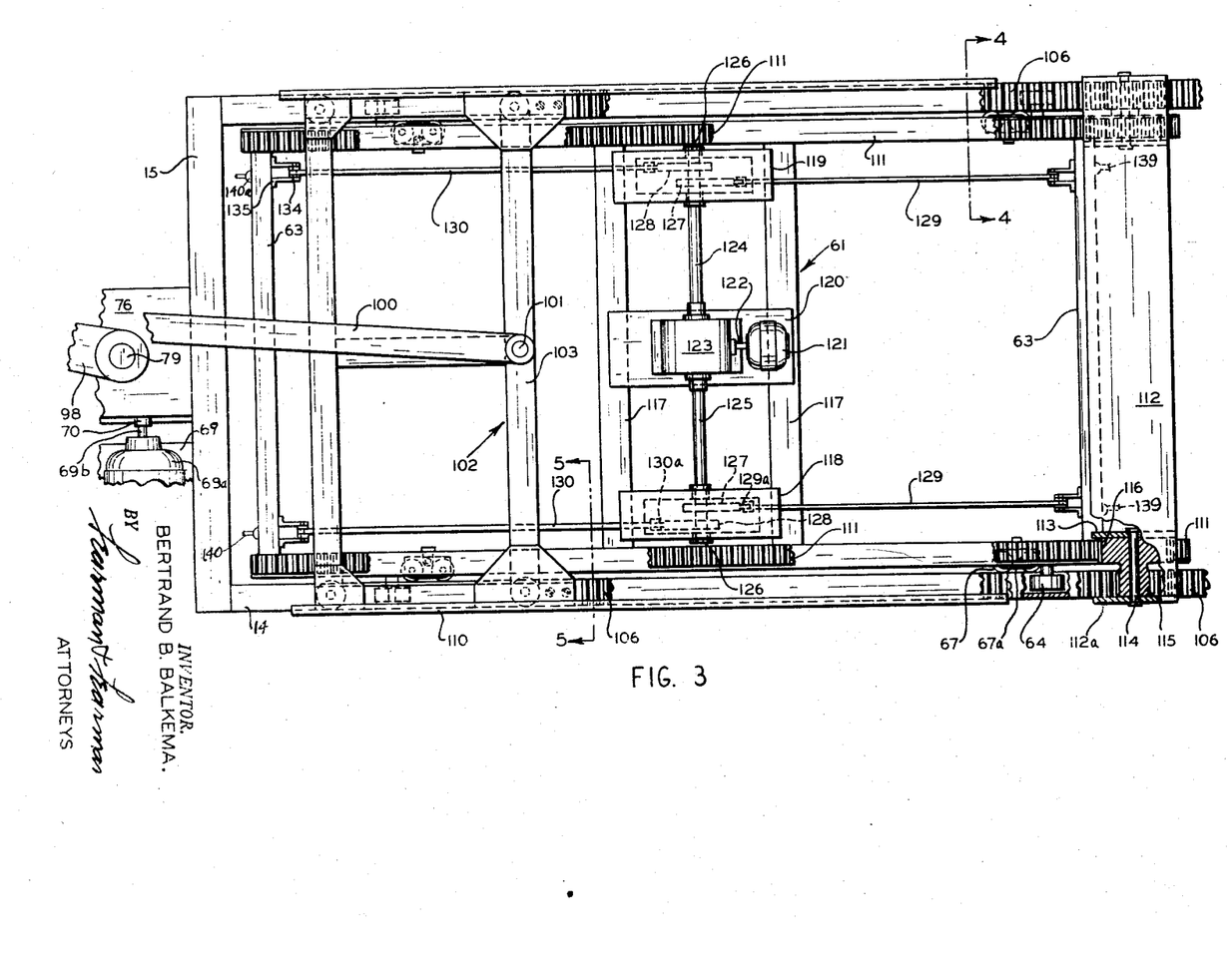
Fig. 3 is an enlarged, fragmentary, partly sectional, plan view illustrating the mechanism for moving the upper carriage and transferring the uppermost cab in the left column of cages in Fig. 10 to the stack of cages at the right.

Referring now more particularly to the accompanying drawings in which I have shown a representative embodiment of the invention, a letter F generally indicates the framework of my storage apparatus which is fabricated of heavy beams or the like and is preferably supported on a suitable concrete foundation which is capable of bearing the load to be carried by the apparatus. In Fig. 1 lower end channel beams 10 have angles 11 welded thereto which carry spanning side channel beams 12, and vertical beams 13 riveted or otherwise fixed on the beams 10 support the upper side beams 14 and suitable upper end beams 15 (Fig. 3) to form a rugged frame capable of supporting the load carrying elements which will be described. Vertical beams 16 intermediate the end members or beams 13 are anchored to continuous cross beams 17 to add rigidity to the structure. The particular frame illustrated can be varied to suit the load to be carried, of course, and to suit the path of travel to be followed by the load carrying cabs or cages C. In the drawings I have demonstrated a system in which the cabs or cages C are arranged in a pair of vertical columns or stacks and the cabs travel in an endwise direction from one stack to the other at the upper and lower ends of the columns. The direction of travel of the indexing cabs is shown by the arrows a, b, c and d to be clockwise but it is to be understood that the cabs could travel counterclockwisely or could move from one column to another in a sidewise direction if the stacks were arranged one behind the other in Fig. 1 instead of in end to end relation.

Spanning the vertically spaced side beams 12 and 17 are pairs of channel housings 18 at the left and 18ª at the right which house sets of spaced apart rack bars 19 and 20, and 19ª and 20ª respectively, for raising and lowering the cabs. Plates 21, 22, and 23 (Fig. 2) function as tracks for the rollers 24 which are employed on the racks to insure their smooth up and down movement. The sets of vertical racks 19—20, and 19ª—20ª, are actuated by pinions 25 which are interposed between and mesh with them, and clearly the pinions 25 will raise racks 19 and 19ª while lowering racks 20 and 20ª or will raise racks 20 and 20ª while lowering racks 19 and 19ª. Some of the cabs C have transversely projecting lugs 26 thereon which are adapted to be engaged by lugs 27 on the racks 19 and 19ª and alternate cabs have lugs 26ª thereon which are adapted to be engaged by lugs 27ª on the racks 20 and 20ª. The racks 19ª and 20ª alternately support the right hand column of cages as they lower them successively to a transfer carriage to be later described and the racks 19 and 20 alternately support the column of cages at the left as they raise the column of cabs after a cab has been transferred from the right hand column of cabs. The employment of a pair of racks, one on each side of a driving pinion, provides a rigid and balanced construction capable of carrying the cabs and their loads.

Figure 2:
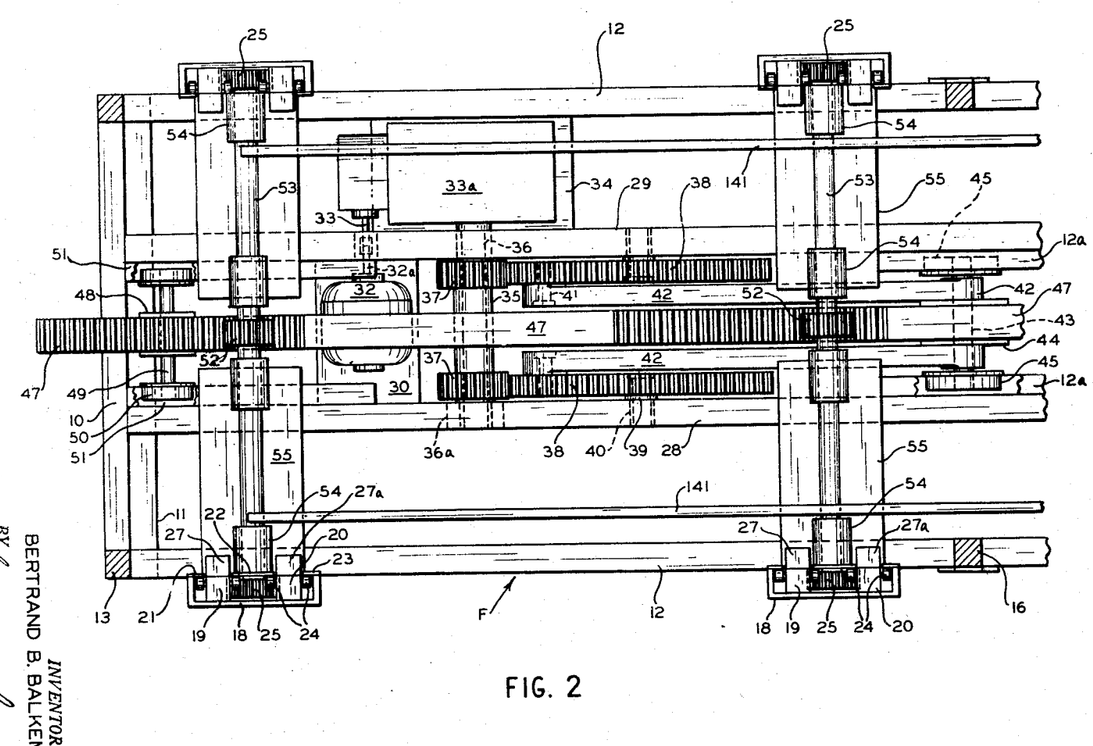
Fig. 2 is an enlarged, fragmentary, sectional plan view taken on the line 2—2 of Fig. 1 and illustrating in more detail the mechanism for raising and lowering the stacked cabs or cages.

As shown in Fig. 2 a pair of spaced apart beams 28 and 29 span the end channels 10 and are supported on channels 12ª. A plate 30 constituting part of a motor platform 31 carries a motor 32 of the order of five horsepower and the armature shaft 32ª of the motor is coupled to the input shaft 33 of a conventional speed reducer 33ª which is similarly supported on a platform 34. A tubular drive shaft 35 is fixed to the output shaft 36 of the reducer and is journaled at its opposite end in a bearing 36ª. Pinions 37 fast on the shaft 35 are in mesh with enlarged gears 38 which have stub shafts 39 journaled in bearings 40 provided on the beams 28 and 29. Provided on the gears 38 are eccentrically disposed crankpins 41 on which connecting rods 42 are mounted and the opposite ends of the rods are connected to a rack support shaft 43 which has a rack support 44 thereon. Guide rollers 45 revolvable in bearings on the ends of shaft 43 travel in guide brackets 46 fixed to the inner faces of beams 12ª (Fig. 2). The ends of the longitudinally disposed drive rack 47 which is fixed to support 44 are similarly secured by supports 48 which are mounted on shafts 49 and carry revolvable rollers 50 which travel in guide brackets 51. The rack 47, of course, extends the full length of the structure and has sections of teeth thereon meshing with pinions 52 which are fixed on the same shafts 53 which support the pinions 25 for directly driving the vertical racks 19 and 20, and 19ª and 20ª. The shafts 53 are journaled in bearings 54 mounted on plates 55 which span the upper edges of the side beams 55ª as shown. While only the left portion of the structure is shown in Fig. 2 it should be understood that similar shafts 53 having gears 52 thereon which mesh with the drive rack 47 are provided at the right portion of the structure to drive the pair of pinions 25 at the right. Also a similar arrangement including elements 48, 49, 50 and 51 is provided at the right end of the structure to secure the right end of the longitudinally moving drive rack 47.

The particular arrangement described for driving the centrally disposed rack 47 and for supporting the various drive elements in balance or equilibrium is deemed very important to the invention since it is believed to be far less complex and more reliable and efficient than any drive for such a structure previously devised.

The cabs or cages C which rest one upon the other can be of varying construction but are shown for the sake of simplicity as comprising upper and lower rails 56 and 57 joined by side beams 58 and end beams 59. The relatively wide and heavy beams 58 project beyond the rails 56 and 57 so that they take the full weight of the cabs above in each case. Longitudinally spaced rollers 60 mounted on the rails 56 are provided to support the gondolas G in which are the parts to be stored. Plainly the rollers 60 will also support pallets and the like, but for vehicles floors may be provided for each cage. The ends of the cabs are preferably open so that loading can take place from one end and unloading from the other.

At the upper end of the structure the uppermost cab on the left column of cabs must be transferred from the left column to the right column (note that this transfer has taken place in Fig. 1) and this movement, involving a considerable longitudinal travel, must take place in timed sequence relative to the lowering and raising of the respective stacks of cages.

Figure 4:
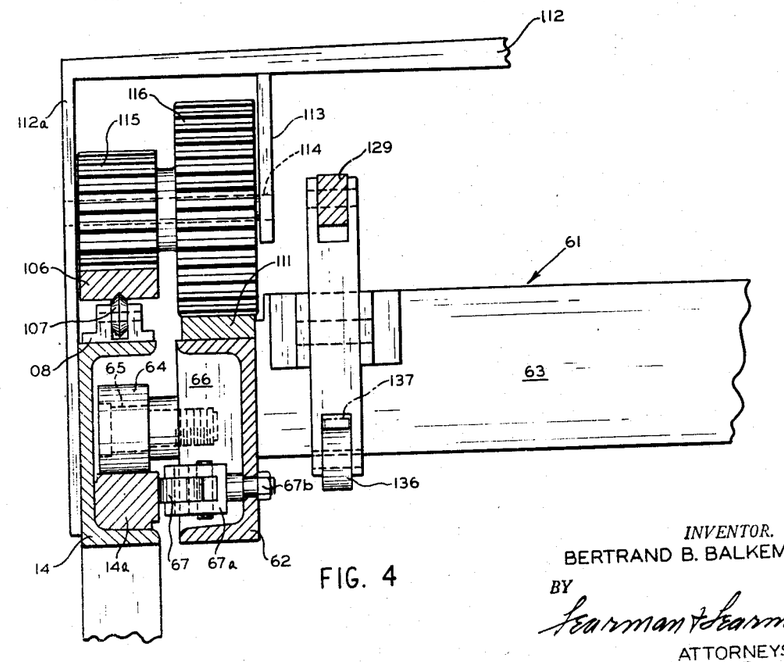
Fig. 4 is an enlarged, transverse, sectional view taken on the line 4—4 of Fig. 3.

Provided within the top channel beams 14 are tracks 14ª (Figs. 1 and 4) which extend the full length of the structure and a carriage 61 for initially lifting the uppermost cab at the left and transporting it across to the stack at the right is adapted to travel longiudinally on these tracks. The carriage which I have generally designated 61 comprises side channels 62 connected by end cross beams 63, and rollers 64 rotatable in bearings on shafts 65 projecting from webs 66 in the channels ride on the tracks 14ª. Also horizontally disposed rollers 67 mounted in clevises 67ª secured to the bears 62 as at 67ᵇ ride on the inner vertical faces of the tracks and it will be plain that the carriage 61 will travel very smoothly without any lateral displacement on the tracks 60.

One of the principal aims of the invention is to drive the various elements in a practical and economical manner from the standpoint of both original cost and maintenance. Certain problems arise as a consequence, if the carriage is to be driven by a constant speed electric motor (Fig. 6) of low horsepower rating, which have not to my knowledge been previously solved. For instance, the carriage in transporting a loaded cab from left to right will want to move as fast as is safely possible considering its loaded condition, but obviously it can be returned at a considerably more rapid rate after it has released the loaded cab it carries. By virtue of the instant design it is possible to return the carriage while the cabs are indexing to raise a cab in the left column up to replace the cab moved to the right column. Obviously the return of the carriage must be accomplished within the time required for a cab to be raised a distance equal substantially to its height. Another factor to be considered is that more power is required to move the carriage when it is loaded than when it is returning without a cab or cage. A motor of a size to directly drive the loaded carriage 61 and also the lower carriage 68 to be later described, which is connected thereto and moves a cab from the bottom of the stack at the right to the bottom of the left hand stack, could be employed; however, obviously its power is not required on the return stroke. The arrangement which has been perfected for moving the carriages to and fro solves both problems in that the carriages when loaded are moved at a slower rate of travel than when they are returned, and a system for multiplying the stroke of the crank which is driven by the motor, and providing an increased mechanical advantage, is provided which permits the use of a relatively light motor.

A motor platform 69 (Figs. 3 and 6) is fixed on the structure near the upper left end thereof and carries a motor 69ª. The drive shaft 69ᵇ of the motor 69ª is coupled to the input shaft 70 of a reducer 71 which has an output shaft 72. A coupling 73 keyed on the shaft 72 carries a splined shaft 74 which is journaled at its upper end in a roller bearing 75 provided in a bracket 76. The latter bracket 76 also has a roller bearing 78 for accommodating a shaft 79 which is supported in axial parallelism with shaft 74 by a thrust bearing 80 mounted on a platform 80ª. Gears 81 and 82 freely rotatable on bushings 83 and 84 respectively are provided on opposite ends of shaft 74, and gears 85 and 86 meshing with the gears 81 and 82 respectively are provided on opposite ends of shaft 79, the gears 85 and 86 being keyed on the shaft 79. It will be noted that the gear 81 is of larger diameter than gear 82 and that gear 85 is of larger diameter than gear 86.

Figure 6:
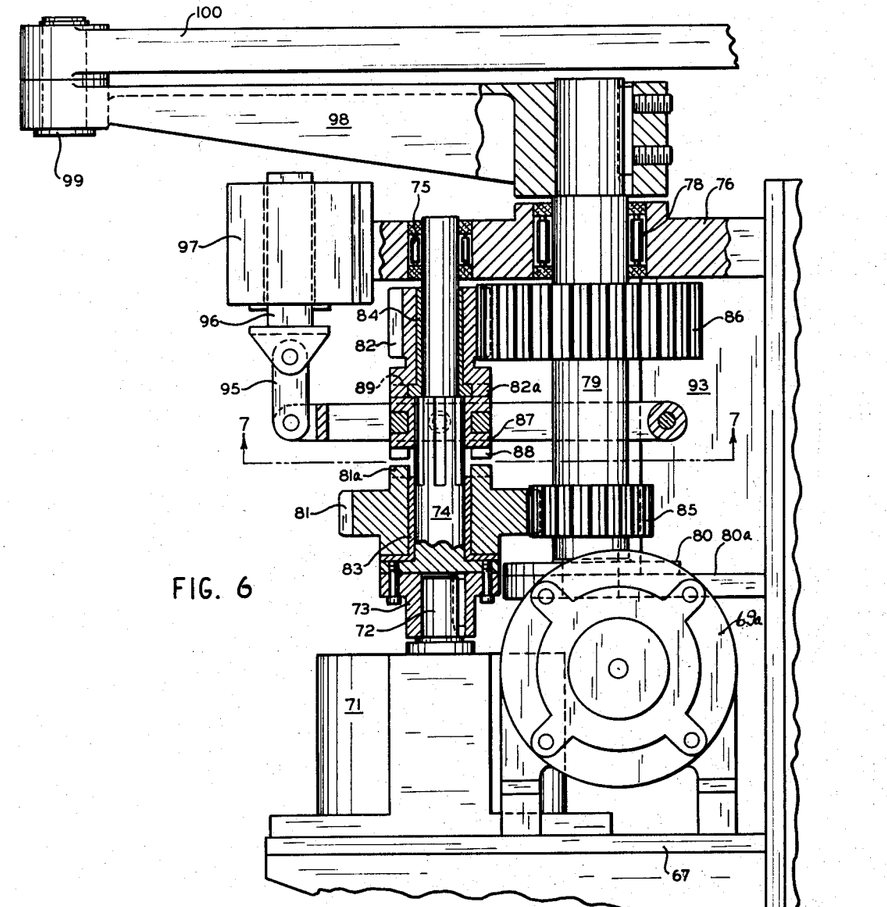
Fig. 6 is an enlarged, fragmentary, partly sectional view showing the motor for driving the upper transfer carriage and illustrating the mechanism which permits it to drive the carriage at different rates of speed.
Figure 7:
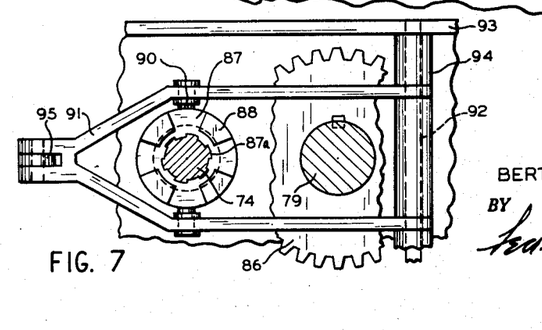
Fig. 7 is a fragmentary, plan, sectional view taken on the line 7—7 of Fig. 6.

The hubs of the gears 81 and 82 carry oppositely disposed teeth 81ª and 82ª respectively and a clutch ring 87 having lower teeth 88 and upper teeth 89 is slidable axially on the splined shaft 74 and will drive either the gear 81 or the gear 82 depending on the position of the clutch ring 87. The ring 87 is, of course, internally splined as at 87ª so that it is non-rotatable on shaft 74 and the teeth 88 and 89 are of a size to intermesh or interlock with the teeth 81ª and 82ª of the gears 81 and 82. The ring 87 is pinned as at 90 to a clevis 91 (see Figs. 6 and 7) which is pivoted on a shaft 92 spanning a pair of side plates 93 which connect the bracket 76 and platform 80ª. Spacers 94 are provided on the shaft 92 and the opposite end of the clevis 91 is connected by a link 95 to the armature plunger 96 of a solenoid 97 which is fixed in bracket 76. In Fig. 6 the solenoid 97 is energized and plunger 96 has been drawn inwardly to move the clutch ring 87 up into engagement with the clutch teeth 82ª of gear 82. Accordingly, gear 86 which is relatively large in diameter will drive shaft 79 at a slower rate of speed than if the clutch ring 83 were driving gear 81 and thus gear 85. When the loaded carriages are to be transferred, the solenoid 97 is energized so that the clutch ring 83 is in "up" position and the carriages will move at the slower speed. When the carriages are to return, the solenoid 97 is deenergized and the ring is returned by gravity into meshed relation with the hub teeth 81ª of gear 81 so that the shaft 79 will be driven at a faster rate of travel.

Figure 5:
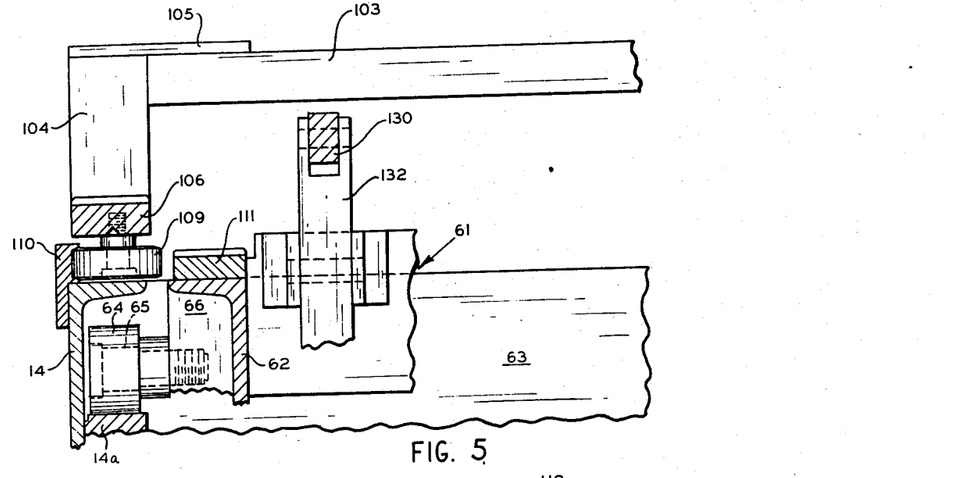
Fig. 5 is an enlarged, transverse, sectional view taken on the line 5—5 of Fig. 3.

The driven shaft 79 projects above bracket 76 as shown in Fig. 6 and a crank arm 98 is keyed on the shaft 79. Pivotally mounted at 99 on the crank arm 98 is a connecting rod 100 which is pivotally connected as at 101 to a frame 102 which includes a crossbeam 103 and depending legs 104 (Fig. 5) secured thereto by gusset members 105. The legs 104 carry outer rack bars 106 which are movable longitudinally on rollers 107 pivotally mounted in brackets 108 secured at suitably spaced intervals on the side channels 14. Laterally disposed rollers 109 depending from the racks 106 guide on tracks 110 fixed on the channels 14 to aid in maintaining the rack bars in lateral alignment. The rollers 109 do not engage the upper faces of beams 14 and are located so that they do not come into engagement with brackets 108 during travel of the rack bars 106.

The carriage 61 has rack bars 111 fixed thereon and to multiply the movement of the racks 106 a bail-shaped frame 112 fixed to the beams 14 carries shafts 114 between its sides 112ª and depending leg members 113. Mounted on the shafts 114 to revolve thereon are gear units which comprise gears 115 in mesh with racks 106 and gears 116 of larger diameter in engagement with the racks 111. Since the gears 116 are of larger diameter, the racks 111 will have a considerably increased path of travel relative to bars 106 which need not be moved a great distance by the crank arm 98 in order to actuate the rack bars 111 and carriage 61 through a path of travel sufficient to move a cab from the column at the left to the column at the right. The mechanism for multiplying the movement of the driving member and increasing its mechanical advantage is, of course, very important to the invention.

The manner in which the carriage 61 lifts and carries the cab it is to transport will now be described and it should be understood that the loaded cab need only be lifted a fraction of an inch to a level such that it barely clears the cab beneath. While it might be thought that a relatively heavy motor would be required to lift a fully loaded cab (which might be carrying as much as 7000 pounds), I have found it possible to provide mechanism having such a mechanical advantage that a relatively light motor in terms of horsepower rating can be employed.

Mounted centrally on the carriage 61 on crossbeams 117 are cam housings 118 and 119, and an intermediate motor platform 120. A motor 121 on platform 120 is coupled to the input shaft 122 of a reducer 123 and a pair of output shafts 124 and 125 lead from the reducer and are journaled in bearings 126 at their outer ends which are provided in housings 118 and 119. A pair of cams 127 and 128 are provided on each end of the shafts 124 and 125 and all of the cams are identical in configuration; however, each cam 127 is displaced 180° relative to its companion cam 128.

Cam follower bars 129 and 130 have rollers 129ª and 130ª in engagement with the cams 127 and 128 respectively and these slide bars 129 and 130 extend through guide openings formed in the end walls of housings 118 and 119. At their outer ends the bars 129 and 130 are connected by means of a pin and slot connection 131 (Fig. 10) to the upper ends of lever arms 132 and 133 respectively which are pivotally supported intermediate their ends on pins 134 (see Fig. 5) spanning brackets 135 fixed on the carriage end beams 63. The lower ends of arms 132 and 133 which freely receive lugs 137 (Fig. 4) have lifting rollers 136 thereon adapted to engage under lugs 137 on the upper ends of the cages C. Since the surfaces 137ª of the lugs are sloped downwardly plainly the particular cage will be lifted by the rollers 136 traveling inwardly on these surfaces as the arms 132 and 133 are swung inwardly. The motor 121 is actuated only sufficiently to lift the cage at the upper left and its operation is timed so that it operates prior to the time motor 69ª is energized to move carriage 61 to the right.

At the time that the upper carriage 61 is moving to the right the lower carriage 68 is moved to the left because cables 138 and 139 trained around pulleys 140 and 141 respectively secured in brackets 142 on the frame F connect the carriages 61 and 68. The cables 138 and 139 secure to the opposite ends of carriages 61 and 68 at points 140ª. The lower carriage 68 may comprise simply a box-like frame which travels on tracks 143 (see Fig. 8). Preferably the frame will include end members 68ª connected by side rails 68ᵇ and 68ᶜ with support plates 145 thereon. The tracks 143 are supported on I beams 146 and rollers 147 and 148 carried by the rails 68b and 68c ride on the tracks as shown.

In Fig. 1 the apparatus is in a loading position with the empty cage C' at the lower left in position to have part-filled gondolas loaded thereon. It will be noted that the other cages C carry gondolas which will be assumed to have parts or castings therein. In Figure 1 cage C'' on the top of the stack of cages at the right has just been moved from left to right by the carriage 61 and the cage C''' has, of course, simultaneously been moved from right to left by the carriage 68.

Figure 10:
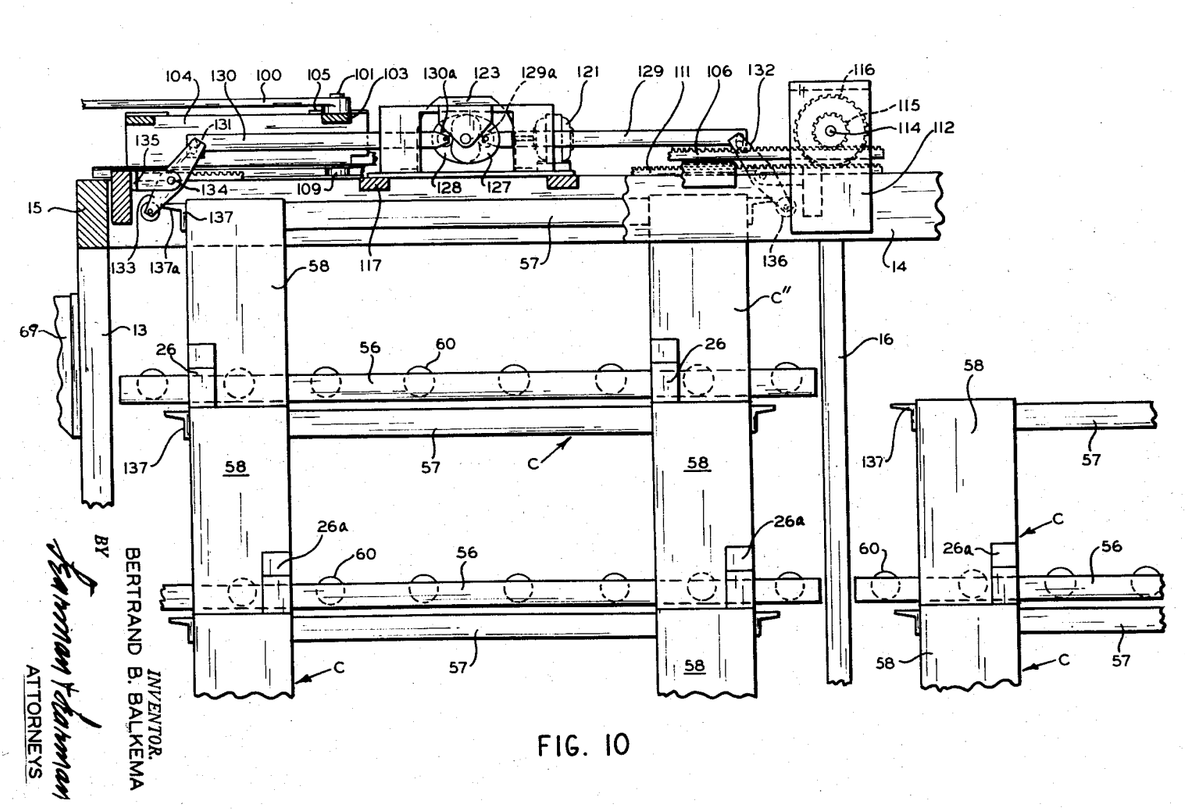
Fig. 10 is an enlarged, fragmentary, side elevational view showing the upper transfer carriage about to move the uppermost cage in the column of cages at the left to the position in which it is shown in Fig. 1.

Fig. 10 illustrates the immediately previous position of the carriage 61 and shows it disposed at the left side of the apparatus with its depending lift arms 132 and 133 outward of the lugs 137 on cage C''. In Fig. 10 the follower rollers 129a and 130a on the slide bars 129 and 130 are engaging the dwell portions of cams 127 and 128 and the apparatus is at rest. When the various elements of the apparatus are in the position in which they are shown in Fig. 10, a cage rests on the lower carriage 68 which is at the lower right under the right column of cages in position to be unloaded. Once the cage is unloaded, it will be transferred to the position in which it is shown in Fig. 1 for loading. To effect this transfer motor 121 is energized to drive the shafts 124 and 125 and the cams 127 and 128 move the slide rods 129 and 130 outwardly so that the arms 132 and 133 are swung downwardly and inwardly along the inclined surfaces 137a of the lugs 137 to lift the cage C' a fraction of an inch.

Figure 8:
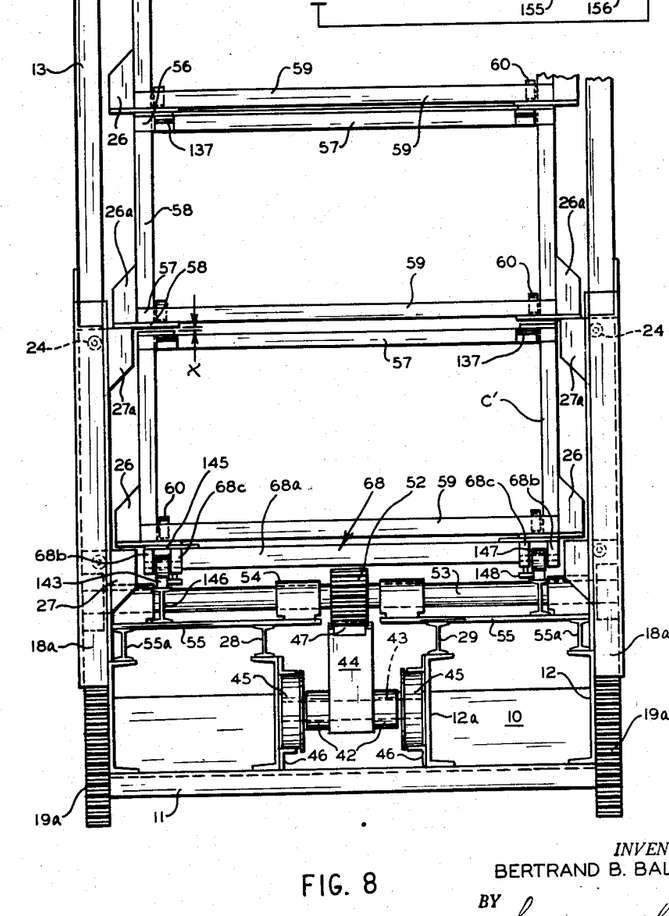
Fig. 8 is an enlarged end elevational view taken from the right end of the machine shown in Fig. 1, certain of the mechanism for driving the raising and lowering racks being omitted in the interest of clarity.
Figure 9:
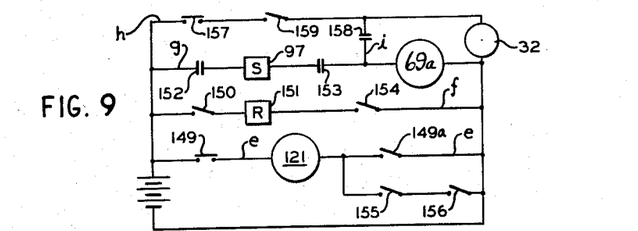
Fig. 9 is a schematically depicted, electrical, control circuit for operating the various drive motors in timed relation.

The three motors 32 (for driving the raising and lowering racks), 69a (for moving the transfer carriages), and 121 (actuating arms 132 and 133) must operate in timed synchronism. The circuit diagram depicted in Fig. 8 illustrates an electrical control system which could be employed. To energize motor 121 as described, a push button 149 in series with motor 121 in a circuit e is manually or electrically depressed. When the arms 132 and 133 reach substantially vertical position a normally closed limit switch 149a in circuit line e in the path of one of the arms is engaged and opens to deenergize motor 121. At the same time a normally open limit switch 150 in circuit line f in the path of one of the arms 132 or 133 is tripped and energizes an electromagnetic holding relay 151 in circuit line f. The relay contacts 152 which are connected in circuit line g are closed when the relay is energized and, since contacts 152 are electrically connected in series with solenoid 97, the latter moves clutch ring 87 up into engagement with gear 82 to the position in which it is shown in Fig. 6. A time delay relay 153 in circuit line g holds motor 69a (also in circuit g) out of operation for just an instant to permit the clutch to engage and then the motor 69a is energized to move the carriage 61 to the right and the carriage 68 to the left. The carriages are driven through gears 82 and 86, crank arm 98, connecting rod 100, actuating drive-frame 103 with rack bars 106, and travel-multiplying gear units 115—116. The carriage 61 draws the carriage 68, of course, because of the cable connection 140.

Because the larger gear 86 on shaft 79 is being driven the rate of travel of the carriages is slower for transporting the cage C'' to the position in which it is shown in Fig. 1 than for returning the carriages as has been observed. The movement of connecting rod 100 is multiplied by the drive frame-carriage arrangement and the mechanical advantage of the system is similarly multipled. It is important to note that when a cab or cage is in lowermost position (Fig. 8) a clearance "x" exists between this cage and the cage immediately above it. The racks 19, 19a, 20, and 20a "over-travel" to provide this operating clearance.

Fig. 1 shows cage C'' just as it reaches a position above the uppermost cage on the stack at the right an instant before a normally closed limit switch 154 in the path of cage C'' is tripped. When the latter switch (which is in circuit line f) is tripped, relay 151 is deenergized and the contacts 152 open. Motor 69a ceases operation and the solenoid 97 is deenergized so that the clutch ring 87 falls by gravity into engagement with the lower gear 81 on shaft 74. Simultaneously a normally open limit switch 155 was closed upon engagement of the cage C'' therewith to again energize motor 121 and arms 132 and 133 are swung upwardly and outwardly out of engagement with the lugs 137 on cage C'' by the motor 121 operating through the cams 127 and 128 and the follower bars 129 and 130. When the arms 127 and 128 reach this position a normally closed limit switch 156 in their path is opened and motor 121 is deenergized. The apparatus will usually be halted in this position (Fig. 1) to permit reloading of gondolas on cage C' until such a time as the operator wants to unload the parts on cage C''' and this position in fact might be termed the normal "rest" position of the apparatus.

When the operator does want to obtain parts on cage C''' he presses button 157 in circuit line h which energizes motor 32 therein. The motor 32 drives main drive rack 47 through reducer 33a, gears 37 and 38, and connecting rods 42. The rack 47 drives pinions 52 and thus pinions 25 so that racks 19 and 19a are raised and racks 20 and 20a are lowered. Thus from the position of Fig. 1 the left column of cabs moves upwardly to fill the space at the upper left in this figure and the right column of cabs C moves downwardly to fill the space at the lower right. A circuit i connects circuits h and j so that motor 69a is almost immediately energized also. The time delay relay 158 in circuit i holds up energization of motor 69a until the cage C'' lowers sufficiently to clear arms 132 and 133. Return of the carriages is at a relatively rapid rate because the smaller diameter gear 85 on shaft 79 is being driven. The carriages must be returned at a rate fast enough to get the carriage 68 under the descending cage C'''.

In Fig. 1 lugs 27a on the racks 20 and 20a are engaged under lugs 26a on the cage above cage C' and lugs 26a on cage C'''. When racks 19 are raised, lugs 27 thereon move up into engagement with lugs 26 on cage C' from a position slightly below them and raise the cage C'. Simultaneously lugs 27 on racks 19a move upwardly and finally engage the support the cage above cage C'''. Cage C''' is deposited on the carriage 68 by the racks 20a shortly before they complete their downward stroke.

The racks 19, 20, 19a, and 20a are all driven simultaneously upon movement of the longitudinal rack bar 47 and it should be apparent that thus the weight of the one column of cabs is substantially counterbalanced by the weight of the other column. Since the cages carry substantially an equivalent load the state of balance is maintained and surprisingly little power is required to raise and lower the columns of cages. When the cage C''' has lowered onto carriage 68 a normally closed limit switch 159 in its path is opened and motors 32 and 69a are deenergized. The unloading of cage C''' can now proceed and when the cage C''' has been unloaded and the operator desires to reload the cage he need only press button 149 as has been described to move the carriage 68 to the left into the space under the left column of cages. At the same time the carriage 61 transports the uppermost cage to the right as has also been previously described.

It should be apparent that the instant storage apparatus is of very practical design and will be widely used. There may, of course, be variations in the operating procedure. The apparatus could operate in reverse if desired or to lower a particular cage into position for unloading the apparatus could be rapidly cycled. By duplicating the apparatus which takes up a minimum floor space in a building, considerable storage capacity can be secured. The columns of cages may have any desired number of cages and obviously this would depend on the maximum loads for which the various supporting and transferring elements are designed and the rating of the motors employed for driving them.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

In the claims:

1. Apparatus for storage and the like comprising, a plurality of cages arranged in adjacent vertical columns, means for raising the cages in one column a certain distance lowering the cages in the other column, and carriage means transferring a cage from one column to another, a motor drivingly connected to said carriage means, and means connecting with said motor for moving said carriage at one speed, said latter means including control means alternately moving said carriage means at said one speed and at said second, more rapid speed when it is transferring a cage and returning it empty at a second more rapid speed.

2. In a storage system or the like, the combination of a plurality of separate storage units arranged in a pair of adjacent vertical columns, means for raising the units in one column and lowering the units in the other column, a carriage transfering a cage in a substantially horizontal path from one column to another, power means, means actuated by said power means moving in a substantially horizontal path, means alternately varying the speed of travel of said last means depending on whether the carriage is transferring a cage or is returning empty, and motion multiplying elements transmitting the movement of said means actuated by the power means to said carriage.

3. In a storage system or the like, the combination of a plurality of cages arranged in a pair of vertical columns, means for raising the units in one column and lowering the cages in the other column, a carriage transferring a cage from one column to the other column, a motor, connecting rod means actuated by said motor moving in a reciprocating path, and motion multiplying elements driven by said connecting rod means connected to said carriage to increase the stroke thereof relative to the stroke of the connecting rod means.

4. In a storage system, article carrying cages arranged in columns in superposed relation, means for raising the cages in one column and lowering the cages in another column, a carriage for transferring a unit in the one column to a unit in the other column, a motor, connecting rod means driven by the motor, a frame driven by the latter means movable in the general plane of travel of the carriage, and motion transmitting means multiplying the travel of said frame connecting said frame to said carriage to drive the carriage therefrom and move said carriage a greater distance than said frame.

5. The combination defined in claim 4 in which at least a pair of racks are provided in generally parallel relation, one of said racks being fast to the said frame and the other being fast to the carriage, and a unitary gear unit including a pair of gears of different diameter in mesh with said racks, the gear of greater diameter being in mesh with the carriage rack to multiply its travel.

6. In a storage system, a plurality of cages arranged in adjacent vertical columns, means indexing the cages in one column upwardly and the cages in the other column downwardly, a carriage transferring a cage from one column to another, a motor for driving said carriage, a shaft driven by said motor, a second shaft driven by said first shaft having a pair of gears of different diameter thereon, drive means on said first shaft selectively driving the second shaft at different speeds through either of said gears, clutch means on said first shaft selectively engaging said drive means with one of said gears, means translating the movement of said second shaft into reciprocating movement for driving the carriage, and control means alternately moving said carriage at a slow speed and a more rapid speed by alternately engaging said drive means with said gears on said second shaft.

7. The combination defined in claim 6 in which spaced apart gears are provided on said first shaft in engagement with the gears on said second shaft, and said clutch means is carried to slide axially on said first shaft into driving engagement with the gears thereon.

8. The combination defined in claim 6 in which said clutch means comprises a clutch ring normally non-rotatable on said first shaft but movable axially thereon, a pivotally supported clevis carries said ring, gears on opposite sides of said ring freely rotatable on said first shaft and in mesh with the gears on said second shaft, and a solenoid connected to said clevis energizable to move said clutch ring on said shaft axially into driving engagement with one of the gears thereon.

9. The combination defined in claim 8 in which said shafts are vertical and said solenoid moves said ring upwardly on said first shaft when energized and permits it to fall by gravity into driving engagement with said other gear on the first shaft when it is deenergized.

10. The combination defined in claim 8 in which the clutch ring has teeth on the end faces thereof, and said gears on the first shaft have hubs with complimentary teeth formed thereon facing said clutch teeth.

11. In a storage system, a plurality of separate storage units arranged in vertical columns with said units of each column supported one upon the other, means for moving one column bodily upward and simultaneously bodily lowering the other column, said means comprising sets of vertically reciprocable pairs of racks at the lower ends of each column, a pinion gear between each pair of racks and in mesh with both racks of each pair for driving the same in opposite directions, means on said units arranged with certain of said racks such that the racks engage the lower unit in a column and oppositely moving racks engage the unit next above, and means for simultaneously driving said pinions first in one direction and then in the other.

12. In a storage system, a frame, adjacent columns of cages with the cages in each column in superposed relation, means for raising the cages in one column and lowering the cages in the other, a carriage supported for reciprocating travel by said frame to move a cage from one column to another, lift arms supported by said carriage movable into lifting engagement with one of the cages, slide rods moving said arms, cam means moving said slide rods to move said arms into lifting engagement and raise the cage for transfer, and a motor on said carriage driving said cam means.

13. In a storage system, a frame, a plurality of cages arranged in adjacent vertical columns, means for raising the columns of cages in one column and lowering the cages in the other column, a carriage supported for reciprocatory travel by said frame to move a cage from one column to another, means on said cages having downwardly inclined under surfaces, lift arms supported by said carriage movable from non-engaging position under said surfaces and down said surfaces on a cage to raise the cage, and power means moving said lift arms.

14. In a storage system, a frame, a plurality of separate cages arranged in vertical columns end to end with said cages in each column supported one upon another, sets of vertically reciprocable pairs of oppositely moving racks at the lower ends of each column for moving one column bodily upward and simultaneously bodily lowering the other column, lugs on said cages arranged with respect to certain of the racks moving in the same direction simultaneously such that the racks engage the lower unit in a column and oppositely moving racks engage the unit next above, drive shafts supported by the frame having pinions thereon arranged between the racks in a pair in mesh with both racks to drive them in opposite directions, other pinions on said shafts, a longitudinally moving rack bar in mesh with said other pinions driving all of said drive shafts, guides for said rack bar supported by the frame, a transverse shaft connected to said rack bar, rollers on said shaft traveling in said guides, connecting rods connected to said latter shaft on both sides of said rack bar, an electric motor for driving said connecting rods, longitudinal tracks supported by the upper end of the frame, a carriage traveling on said tracks for transferring a cage from the top of one column to the top of the other column, a second electric motor supported on the frame for driving the carriage, a connecting rod, mechanism translating the rotation of said second motor into reciprocation of said connecting rod, solenoid actuated clutch means constituting part of said latter mechanism movable to drive said connecting rod at the speed during transfer of a cage by said carriage and at a faster speed on return of said carriage, a second set of tracks on the upper end of said frame, a sub-frame actuated by said connecting rod movable on the second set of tracks, means driving said carriage from said sub-frame moving the carriage in a stroke greater than the stroke of the sub-frame, lift arms carried by the carriage movable from a nonengaging position to lift a cage for transfer, a third electric motor, supported by said carriage, driving the lift arms, and an electrical control circuit for said three motors and solenoid actuated clutch including elements for synchronizing the operation thereof.

15. The combination defined in claim 14 in which a transfer carriage is provided at the lower end of the frame for moving a unit from the stack receiving the cage at the upper end to the first mentioned stack in an opposite direction, and means connecting said lower carriage to the upper carriage so that the two operate in unison.

16. Apparatus for storage and the like comprising a plurality of cages arranged in adjacent vertical columns; means for indexing the cages in one column upwardly a step at a time and lowering the cages in the other column, a step at a time; carriage means transferring a cage from one column to the other column and returning to original position; means drivingly connected to raise the cages in one column and lower the cages in the other column; means drivingly connected to said carriage means for transferring a cage from one column to another at one speed and returning it empty at a different more rapid speed; and control means initiating movement of said cages in said columns during the time when said carriage means is returning empty.

References Cited in the file of this patent

UNITED STATES PATENTS

| | | |
|---|---|---|
| 1,356,051 | Droitcour | Oct. 19, 1920 |
| 1,851,502 | Ferris et al. | Mar. 29, 1932 |
| 1,965,161 | Sheflin | July 3, 1934 |
| 1,980,850 | Clark | Nov. 13, 1934 |
| 2,583,065 | Stephan | Jan. 22, 1952 |
| 2,762,489 | O'Sullivan | Sept. 11, 1956 |